(12) United States Patent
Noto

(10) Patent No.: US 10,001,877 B2
(45) Date of Patent: Jun. 19, 2018

(54) SEMICONDUCTOR DEVICE

(71) Applicant: Synaptics Japan GK, Tokyo (JP)

(72) Inventor: Takayuki Noto, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 175 days.

(21) Appl. No.: 14/628,919

(22) Filed: Feb. 23, 2015

(65) Prior Publication Data

US 2015/0253927 A1    Sep. 10, 2015

(30) Foreign Application Priority Data

Mar. 7, 2014  (JP) ................. 2014-044560

(51) Int. Cl.
G06F 3/041  (2006.01)
G06F 1/32  (2006.01)
G06F 3/044  (2006.01)

(52) U.S. Cl.
CPC .......... G06F 3/0418 (2013.01); G06F 1/3218 (2013.01); G06F 1/3262 (2013.01); G06F 3/044 (2013.01); G06F 3/0416 (2013.01); Y02B 60/32 (2013.01)

(58) Field of Classification Search
CPC ....... G06F 3/0418; G06F 3/0416; G06F 3/044
See application file for complete search history.

(56) References Cited

U.S. PATENT DOCUMENTS

| | | | | |
|---|---|---|---|---|
| 2008/0309631 A1* | 12/2008 | Westerman | ........... | G06F 1/3203 345/173 |
| 2009/0045823 A1* | 2/2009 | Tasher | ............ | G06F 3/044 324/686 |
| 2009/0066665 A1* | 3/2009 | Lee | ............ | G06F 3/0416 345/173 |
| 2009/0207154 A1* | 8/2009 | Chino | ............ | G06F 3/0416 345/175 |
| 2011/0181544 A1* | 7/2011 | Lee | ............ | G06F 3/042 345/174 |
| 2011/0316797 A1* | 12/2011 | Johansson | ............ | G06F 3/04847 345/173 |
| 2012/0032894 A1* | 2/2012 | Parivar | ............ | G06F 1/3215 345/173 |
| 2012/0062482 A1* | 3/2012 | Ding | ............ | G06F 1/3215 345/173 |
| 2012/0262416 A1* | 10/2012 | Kitamura | ............ | G06F 1/3262 345/174 |
| 2013/0147741 A1* | 6/2013 | Low | ............ | G06F 3/0416 345/173 |
| 2013/0162550 A1* | 6/2013 | Chen | ............ | G06F 1/3262 345/173 |
| 2013/0176273 A1* | 7/2013 | Li | ............ | G06F 1/3262 345/174 |

(Continued)

FOREIGN PATENT DOCUMENTS

JP    2013-206296 A    10/2013

*Primary Examiner* — Dorothy Harris
(74) *Attorney, Agent, or Firm* — Patterson + Sheridan, LLP

(57) ABSTRACT

Embodiments herein describe a touch panel controller that has a first mode and a second mode. The touch panel controller performs a normal scan in the first mode, and performs a low-power scan in the second mode. In the normal scan, all of detection points are targeted for detection on a touch detection plane of a touch panel. In the low-power scan, only every other electrode in a group of electrodes is used to generate detection data.

10 Claims, 9 Drawing Sheets

(56) References Cited

U.S. PATENT DOCUMENTS

2013/0215049 A1* 8/2013 Lee .................. G06F 3/0416
                                                                         345/173
2015/0109217 A1* 4/2015 Zhu .................. G06F 1/3262
                                                                         345/173

* cited by examiner

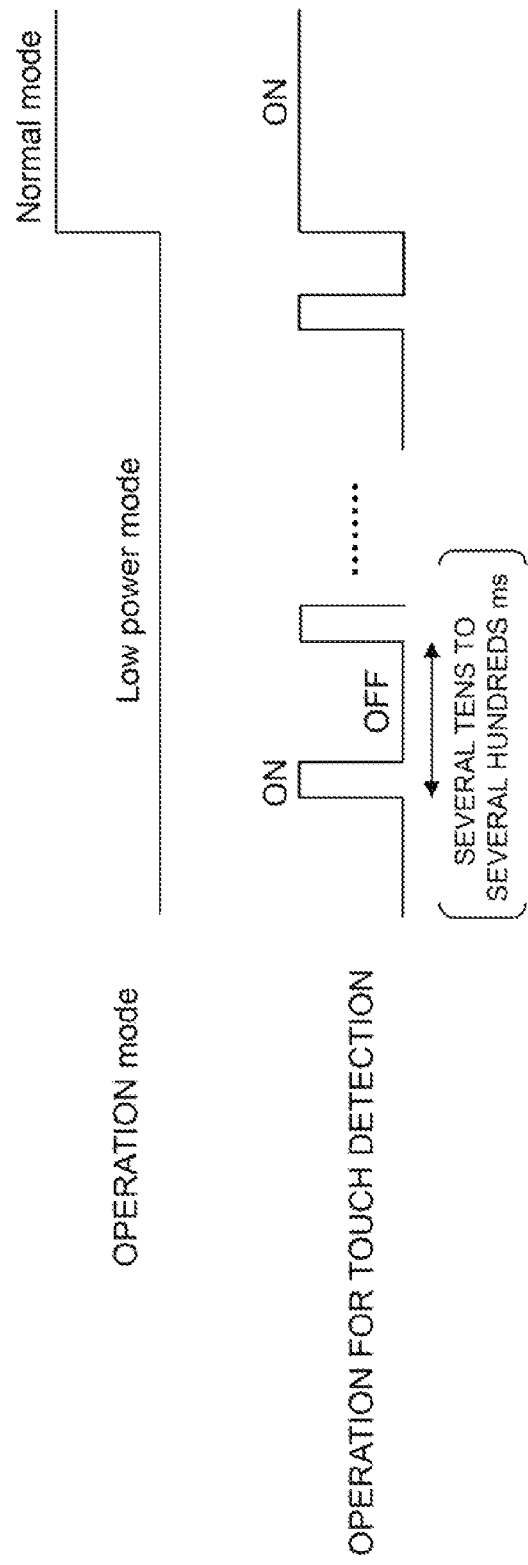

SEMICONDUCTOR DEVICE

CROSS-REFERENCE TO RELATED APPLICATIONS

The Present application claims priority from Japanese application JP 2014-044560 filed on Mar. 7, 2014, the content of which is hereby incorporated by reference into this application.

BACKGROUND

The present invention relates to a touch panel controller which produces detection data according to whether a touch panel detection plane is touched or not, and a technique useful in application to a one-chip controller integrated circuit (IC) having e.g. a touch panel controller, a display driver and a processor.

In touch detection according to a mutual capacitance method, one of an array of X-electrodes and an array of Y-electrodes, which are arranged to intersect with each other, is used as an array of drive electrodes, and the other is used as an array of detection electrodes; while the drive electrodes are selected and driven sequentially, detection data are taken at intersection positions where each drive electrode selected and driven intersects with the detection electrodes. In touch detection according to a self capacitance method, detection data according to touch or no touch are acquired by performing charge transfer on each electrode of X-electrodes and Y-electrodes, which are arranged to intersect with each other. Either of the detection methods needs a detection circuit for touch detection which performs detection by capturing signals arising on detection electrodes in units of the detection electrodes. Each detection circuit takes signal charges according to touch or no touch by using an integration circuit, a switched capacitor circuit or the like to perform a switched capacitor operation.

There has been known a technique for reducing the power consumed by an operation for such touch detection. According to the technique, a touch panel is arranged so that a determination about a touch input is enabled by just monitoring a receive level arising on a particular detection electrode; and the touch panel has an intermittent detection mode in which only the receive level arising on the particular detection electrode is detected at intervals of a fixed length of time for a waiting time of the touch panel waiting for an input operation. According to the arrangement like this, when detecting a touch input, the touch panel transitions to a detection mode. In the detection mode, all of circuits are activated to detect a position subjected to the input operation, whereby the power consumption during the waiting time can be reduced.

The patent document, JP-A-2013-206296 discloses an example of the technique for reducing a power consumed by an operation for touch detection.

SUMMARY

One embodiment of the present disclosure includes a semiconductor device that includes a touch panel controller configured to receive signals from electrodes extending in first and second directions in a touch panel such that the electrodes intersect to form detection points disposed at predetermined intervals. Moreover, the touch panel controller generates detection data indicating whether a detection plane of the touch panel is being touched or not. The touch panel controller performs a normal scan on the touch detection plane of the touch panel in a first mode, where, during the normal scan, all the detection points are used to generate detection data. The touch panel controller also performs a low-power scan on the touch detection plane of the touch panel in a second mode, where, for a group of the electrodes extending in the first direction, the touch panel controller uses only every other electrode in the group to generate detection data.

Another embodiment of the present disclosure is a semiconductor device that includes a touch panel controller configured to drive first electrodes of a touch panel, receive signals from second electrodes of the touch panel, and generate detection data according to whether a detection plane of the touch panel is being touched or not. The first electrodes extend in a first direction and the second electrodes extend in a second direction perpendicular to the first direction such that the first and second electrodes intersect on the touch panel to form detection points. The touch panel controller performs a normal scan on the touch detection plane of the touch panel in a first mode, where, during the normal scan, all the detection points are used to generate detection data. Moreover, touch panel controller performs a low-power scan on the touch detection plane of the touch panel in a second mode, where, for a group of electrodes in the touch panel, the touch panel controller uses only every other electrode in the group to generate detection data during the low-power scan.

Another embodiment of the present disclosure is an apparatus that includes a touch panel controller configured to receive signals from electrodes intersecting in a touch panel to form detection points that divide the touch panel into rows and columns. Moreover, the touch panel controller generates detection data indicating whether a detection plane of the touch panel is being touched or not. The touch panel controller performs a normal scan on the touch detection plane of the touch panel during which all the detection points are used to generate detection data. Further, the touch panel controller performs a low-power scan on the touch detection plane of the touch panel during which only a subset of the detection points are used to generate detection data, where the subset of the detection points are either located only on every other row in a first portion of the touch panel or located on only every other column in a second portion of the touch panel.

BRIEF DESCRIPTION OF THE DRAWINGS

FIG. 9 is a timing diagram schematically showing, by example, the timing of an operation for touch scan in the normal mode and the low-power mode.

DETAILED DESCRIPTION

1. Introduction

Figure 1:
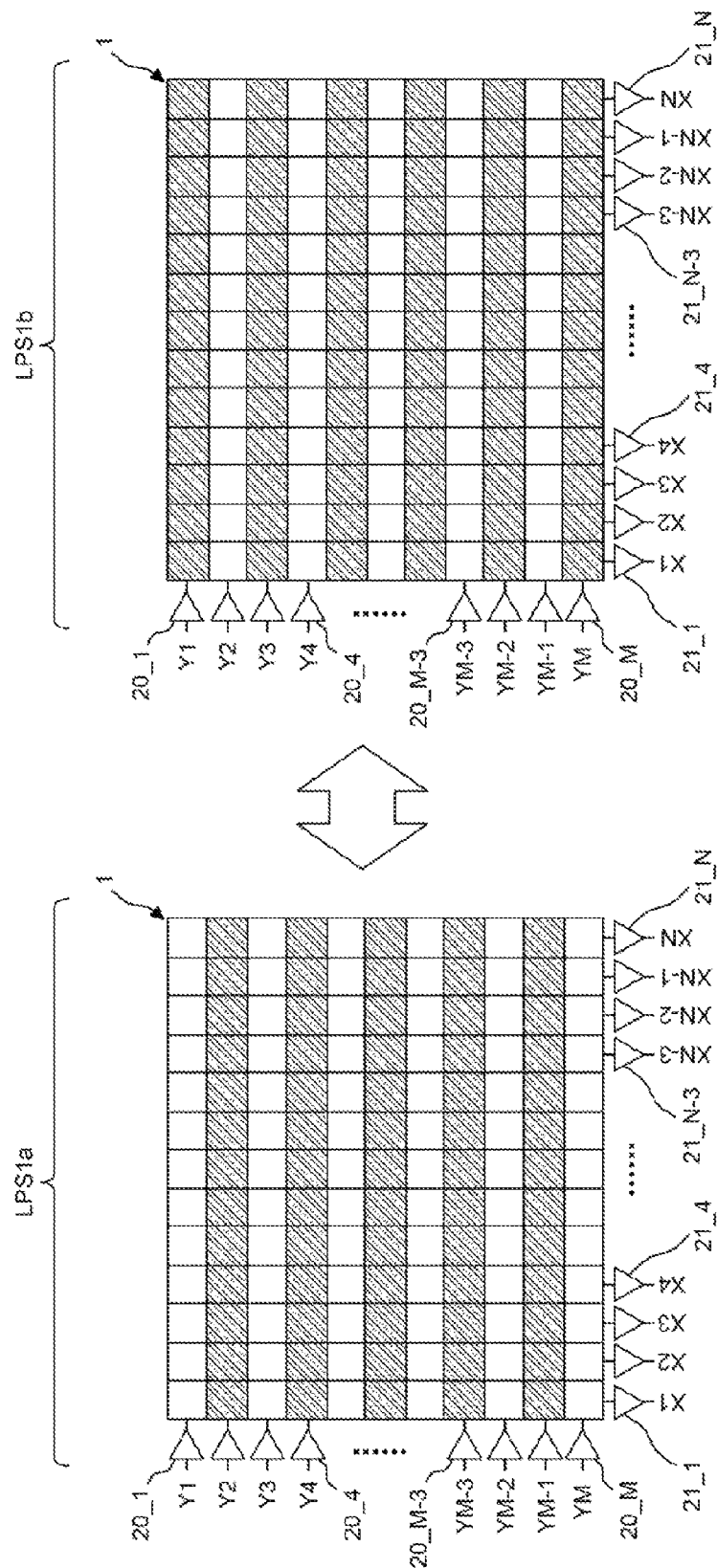
FIG. 1 is an explanatory diagram showing, by example, a low-power scan form, in which the Y-electrodes to be driven are culled at intervals of two lines, and the lines to be culled are alternately replaced with other lines.

As described in JP-A-2013-206296, in the intermittent mode in which touch detection is performed at intervals of a fixed length of time, the power consumption can be reduced during a period in which the intermittent action remains stopped. However, detecting a touch input based on only a partial region such as a center portion of a touch detection plane in the touch panel waiting for a touch input by making a smaller detection region may not be effective because the detection accuracy is worsened as the detection region is made smaller.

One advantage of this disclosure is to provide a semiconductor device which does not need to provide a particular additional circuit, enables the reduction in power consumption without worsening the detection accuracy, and enables the determination about whether a touch panel is touched or untouched on condition that a touch panel is waiting for a touch input.

In one embodiment, for a touch panel controller, a first mode for performing a normal scan and a second mode for performing a low-power scan are adopted. In the normal scan, all of detection points are targeted for detection on a touch detection plane of a touch panel. In the low-power scan, the lines left after cull of lines at intervals of two lines in units of lines of the detection points on the touch detection plane of the touch panel are targeted for detection.

In the low-power scan, the lines left after cull of lines at intervals of two lines are targeted for detection on the touch detection plane. Therefore, it is not required to provide a particular additional circuit; the power consumption is reduced without worsening the detection accuracy in the state of waiting for a touch input; and it becomes possible to make a determination about whether the touch detection plane is being touched or not.

2. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Normal Scan and Low-Power Scan

The semiconductor device (12) includes: a touch panel controller (3) which takes in signals arising on electrodes (Y1 to YM, and X1 to XN) extending in X and Y directions and connected with detection points of a touch panel (1) having the detection points disposed at predetermined intervals, and which creates detection data according to whether a detection plane of the touch panel is being touched or not. The touch panel controller performs a normal scan on the touch detection plane of the touch panel in a first mode, such that during the normal scan, all the detection points are targeted for detection; and the touch panel controller performs a low-power scan on the touch detection plane of the touch panel in units of lines of the detection points in a second mode, such that during the low-power scan, the lines left after cull of lines at intervals of two lines are targeted for detection. Incidentally, in the case of a double-layer touch panel in which the X- and the Y-electrodes are formed in different layers respectively, the detection points may be at intersection positions of the electrodes Y1 to YM, and X1 to XN. In the case of a one-layer touch panel having X- and Y-electrodes formed in the same layer, the electrodes for forming detection points are not restricted by the relation between X- and Y-electrodes.

According to the arrangement like this, the lines left after cull of lines at intervals of two lines are targeted for detection on the touch detection plane in the low-power scan. The distance between the centers of the lines on the touch detection plane in one embodiment is roughly 5 mm. If so, an inter-line area resulting from the line cull can be easily targeted for detection with the aid of the lines adjacent to the culled line. Therefore, almost no failure to take detection signals is considered to take place even if the lines of the X-electrodes left after the cull of lines at intervals of two lines are targeted for detection. Thus, it becomes possible to reduce, by half, detection lines over the whole detection plane of a touch panel without substantially worsening the detection accuracy. Further, it becomes possible to make a determination about whether the touch detection plane is being touched or not while reducing the power consumption without worsening the detection accuracy in the state of waiting for a touch input. Still further, it is not necessary to provide a particular additional circuit.

[2] Alternate Replacement of Culled Detection Lines

In the semiconductor device as described in [1], the touch panel controller alternately replaces lines targeted for the cull at the intervals of two lines with other lines in units of touch detection frames of the touch detection plane (see FIGS. 1 to 4).

According to the arrangement like this, in the case of having failed to take detection signals for an inter-line area resulting from the line cull with the aid of lines adjacent to the culled line and further, even if the distance between the centers of lines on the touch detection plane is made larger than about 5 mm, the substantial worsening of the detection accuracy in the state of waiting for a touch input can be suppressed by alternately replacing detection lines targeted for line cull at intervals of two lines with other detection lines in units of touch detection frames of the touch detection plane.

[3] Low-Power Scan on a Center Portion of the Touch Detection Plane

Figure 2:
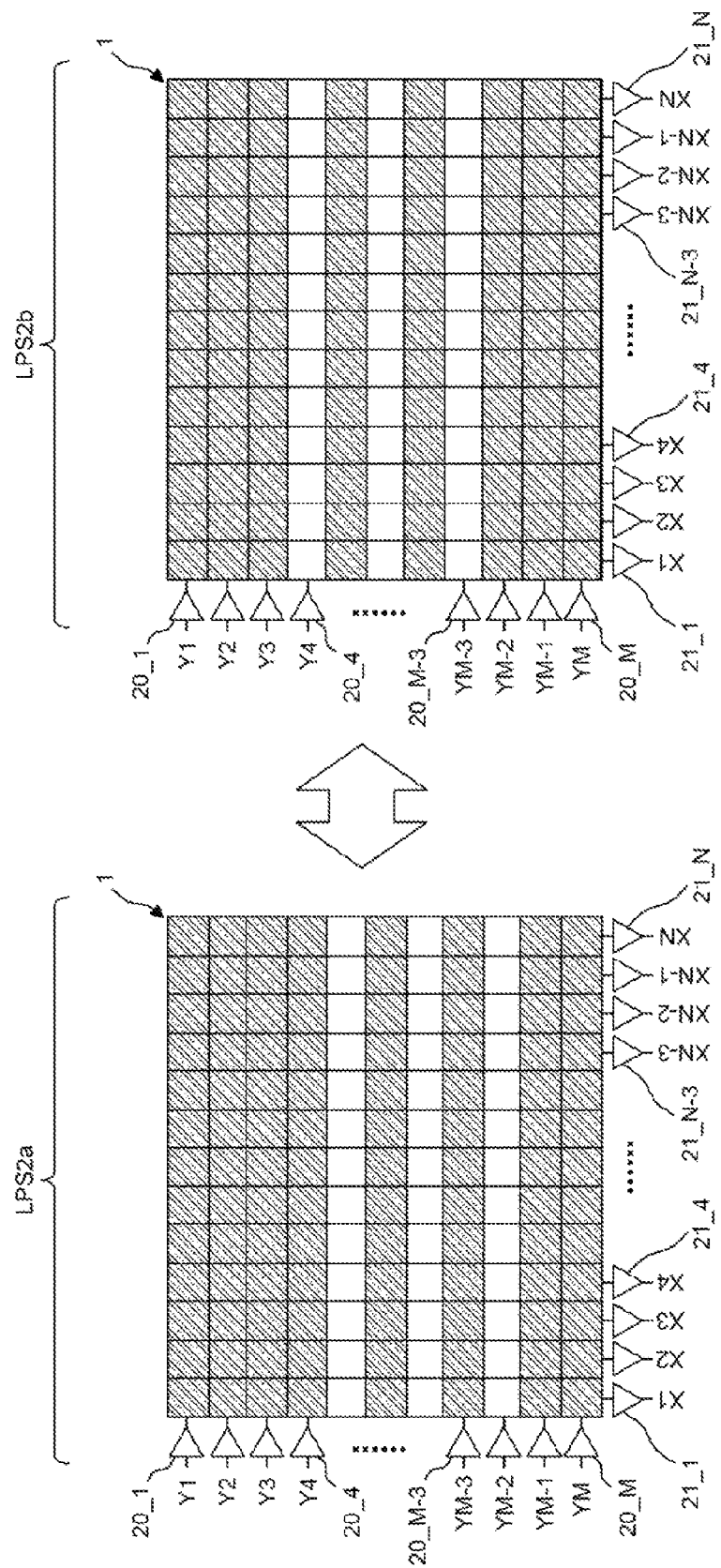
FIG. 2 is an explanatory diagram showing, by example, a scan form by which the low-power scan is limited to a center portion of a touch detection plane, such that during the low-power scan, the Y-electrodes to be driven are culled at intervals of two lines, and the lines to be culled are alternately replaced with other lines.
Figure 4:
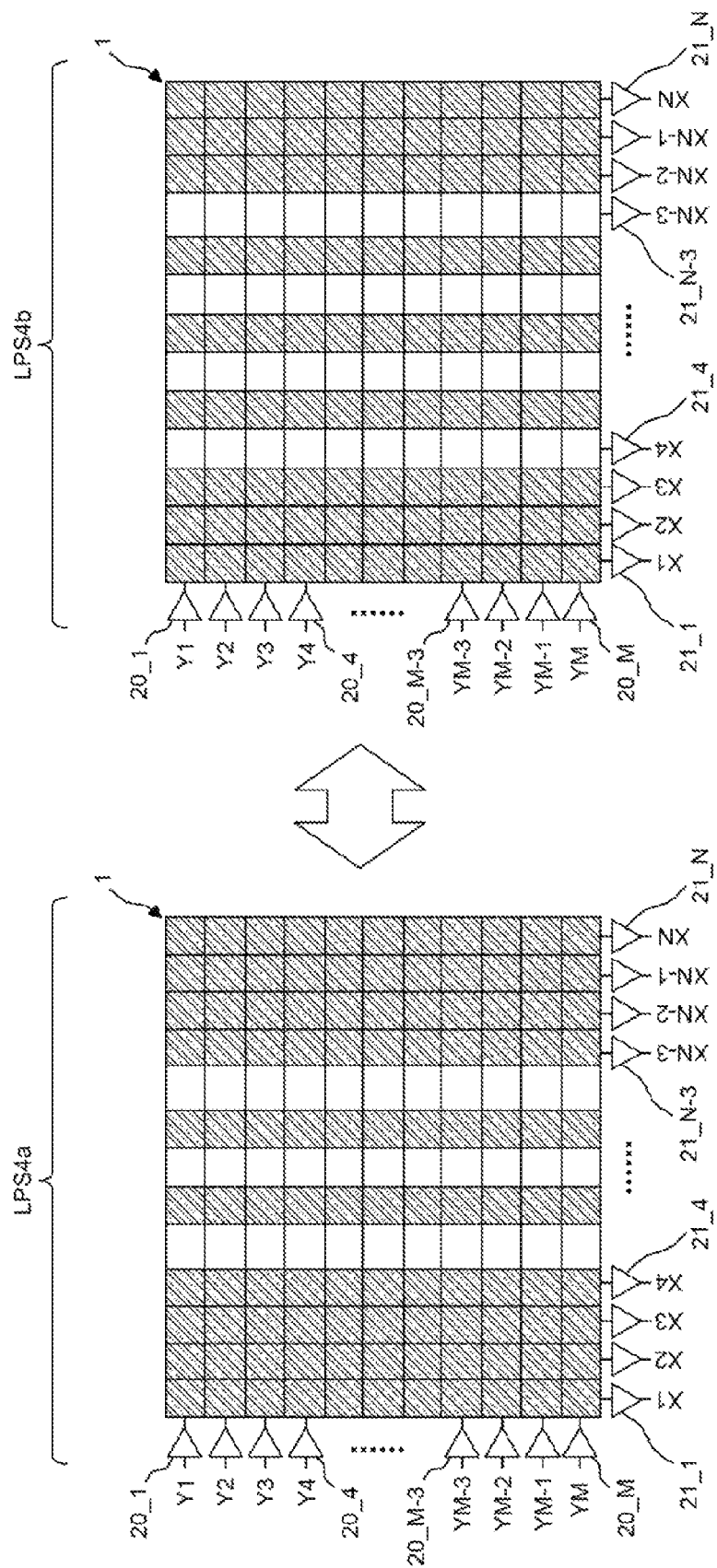
FIG. 4 is an explanatory diagram showing, by example, a scan form, by which the low-power scan is limited to a center portion of a touch detection plane, such that during the low-power scan, the X-electrodes targeted for detection are culled at intervals of two lines, and the lines to be culled are alternately replaced with other lines.

In the semiconductor device as described in [2], the detection lines targeted for detection in the low-power scan after the cull of lines are exclusively for a center portion of the touch detection plane of the touch panel (see FIGS. 2 and 4).

According to the arrangement like this, it is made possible to contribute to the further reduction in power consumption without causing the worsening of the detection accuracy by performing the low-power scan exclusively on a center portion of the touch detection plane. This is because the manipulation on the touch panel is performed most often on the center portion of the touch detection plane in most cases.

[4] Low-Power Scan with a Downtime Arranged Between Intermittent Operations

In the semiconductor device as described in [2], the touch panel controller intermittently performs the low-power scan with a downtime arranged between the low-power scans in the second mode (see FIG. 9).

According to the arrangement like this, the low-power scan causes no interference even if the scan is performed at longer intervals in the case of supposing a case in which a frame is displayed with 60 Hz typically, and a touch detection is performed according to the detection scan in its spare time. This is because all that is needed is to make a detection about touch or no touch—i.e., indentifying a touch coordinate is not required. The device can perform satisfactory even if the low-power scan is not continuously repeated at all times in the second mode. Therefore, it is made possible to contribute to the further reduction in power consumption by intermittently performing the low-power scan with a downtime arranged between the low-power scans in the second mode.

[5] Semiconductor Device Including a Display Driver

The semiconductor device as described in [1] further includes a display driver (4) which controls display of a liquid crystal panel disposed under the touch panel.

The arrangement like this makes easier to synchronously control the display control of the display driver and the touch control of the touch panel.

[6] First Mode (Normal Mode), Second Mode (Low-Power Mode) and Third Mode (Sleep Mode)

In the semiconductor device as described in [5], the first mode is an operation mode in which display of a display panel by the display driver is enabled. The second mode is an operation mode in which display of the display panel by the display driver is disabled. The touch panel controller further has a third mode. In the third mode, the touch detection on the touch panel by the touch panel controller is disabled, and the display of the display panel by the display driver is disabled.

According to the arrangement like this, it becomes possible to control the low power consumption of the semiconductor device by the first mode such as the normal mode, the second mode such as the low-power mode, and the third mode such as the sleep mode.

[7] Processor that Controls the Operation Mode

The semiconductor device as described in [6] further has a processor (5) which controls transition of the operation mode. The processor makes a determination about whether the detection plane of the touch panel is being touched or not based on detection data detected by the low-power scan in the second mode. The processor causes the operation mode to transition from the second mode to the first mode in case that it is determined as a result of the determination that the detection plane is touched. The processor makes a determination about whether the detection plane is touched or not based on detection data detected by the touch detection scan.

According to the arrangement like this, it is possible to transition from the second mode to the first mode under the control of the processor without waste.

[8] Normal Scan and Low-Power Scan in Mutual Capacitance Method

The semiconductor device includes a touch panel controller (3) which drives Y-electrodes (Y1 to YM) of a touch panel, takes in signals arising on X-electrodes (X1 to XN) of the touch panel, and creates detection data according to whether a detection plane of the touch panel is being touched or not. The touch panel has the X-electrodes extending in an X direction and arrayed in a Y direction at predetermined intervals, and the Y-electrodes extending in the Y direction and arrayed in the X direction at predetermined intervals, and uses intersection positions of the X- and Y-electrodes as detection points. The touch panel controller performs a normal scan on the touch detection plane of the touch panel in a first mode, such that during the normal scan, all the detection points are targeted for detection. The touch panel controller performs a low-power scan on the touch detection plane of the touch panel in units of lines of the detection points in a second mode, such that during the low-power scan, the lines left after cull of lines at intervals of two lines are targeted for detection.

According to the arrangement like this, the lines left after cull of lines at intervals of two lines are targeted for detection on the touch detection plane in the low-power scan. The distance between the centers of the lines on the touch detection plane in one embodiment is roughly 5 mm. If so, an inter-line area resulting from the line cull can be easily targeted for detection with the aid of the lines adjacent to the culled line. Therefore, almost no failure to take detection signals is considered to take place even if the lines of the X-electrodes left after the cull of lines at intervals of two lines are targeted for detection. Thus, in regard to a mutual capacitance type touch panel, it becomes possible to reduce, by half, detection lines over the whole detection plane of a touch panel without substantially worsening the detection accuracy. Further, it becomes possible to make a determination about whether the touch detection plane is being touched or not while reducing the power consumption without worsening the detection accuracy in the state of waiting for a touch input. Still further, it is not necessary to provide a particular additional circuit. Incidentally, in the case of performing a touch detection according to a self capacitance method, both the X- and Y-electrodes make lines of detection points. The manipulation to cull the lines of detection points at intervals of two lines may be performed on one of X- and Y-electrodes. In the case of the mutual capacitance type, the lines of detection points may be culled on one of the X-electrodes on the drive side and the Y-electrode on the detection side.

[9] Alternate Replacement of Detection Lines to be Culled

In the semiconductor device as described in [8], the touch panel controller alternately replaces lines targeted for the cull at the intervals of two lines with other lines in units of touch detection frames of the touch detection plane (see FIGS. 1 to 4).

According to the arrangement like this, in the case of having failed to take detection signals for an inter-line area resulting from the line cull with the aid of lines adjacent to the culled line and further, even if the distance between the centers of lines on the touch detection plane is made larger than about 5 mm, the substantial worsening of the detection accuracy in the state of waiting for a touch input can be suppressed by alternately replacing lines targeted for line cull at intervals of two lines with other lines in units of touch detection frames of the touch detection plane.

[10] Cull Y-Electrodes Over the Whole Detection Plane at Intervals of Two Lines

In the semiconductor device as described in [9], the touch panel controller culls the Y-electrodes to be driven sequentially at intervals of two lines in the low-power scan, such that the Y-electrodes are allocated to the whole detection plane (see FIG. 1).

According to the arrangement like this, the low-power scan can be performed with the Y-electrodes on the drive side culled at intervals of two lines over the whole touch detection plane.

[11] Cull Y-Electrodes Allocated to a Part of the Detection Plane at Intervals of Two Lines In the semiconductor device as described in [9], the touch panel controller culls the Y-electrodes to be driven sequentially at intervals of two lines in the low-power scan, such that the Y-electrodes thus culled are allocated to a center portion of the detection plane (see FIG. 2).

According to the arrangement like this, it is made possible to contribute to the further reduction in power consumption without causing the worsening of the detection accuracy by performing the low-power scan with the Y-electrodes of the drive side culled at intervals of two lines exclusively on a center portion of the touch detection plane. This is because the manipulation on the touch panel is performed most often on the center portion of the touch detection plane in most cases.

Figure 3:
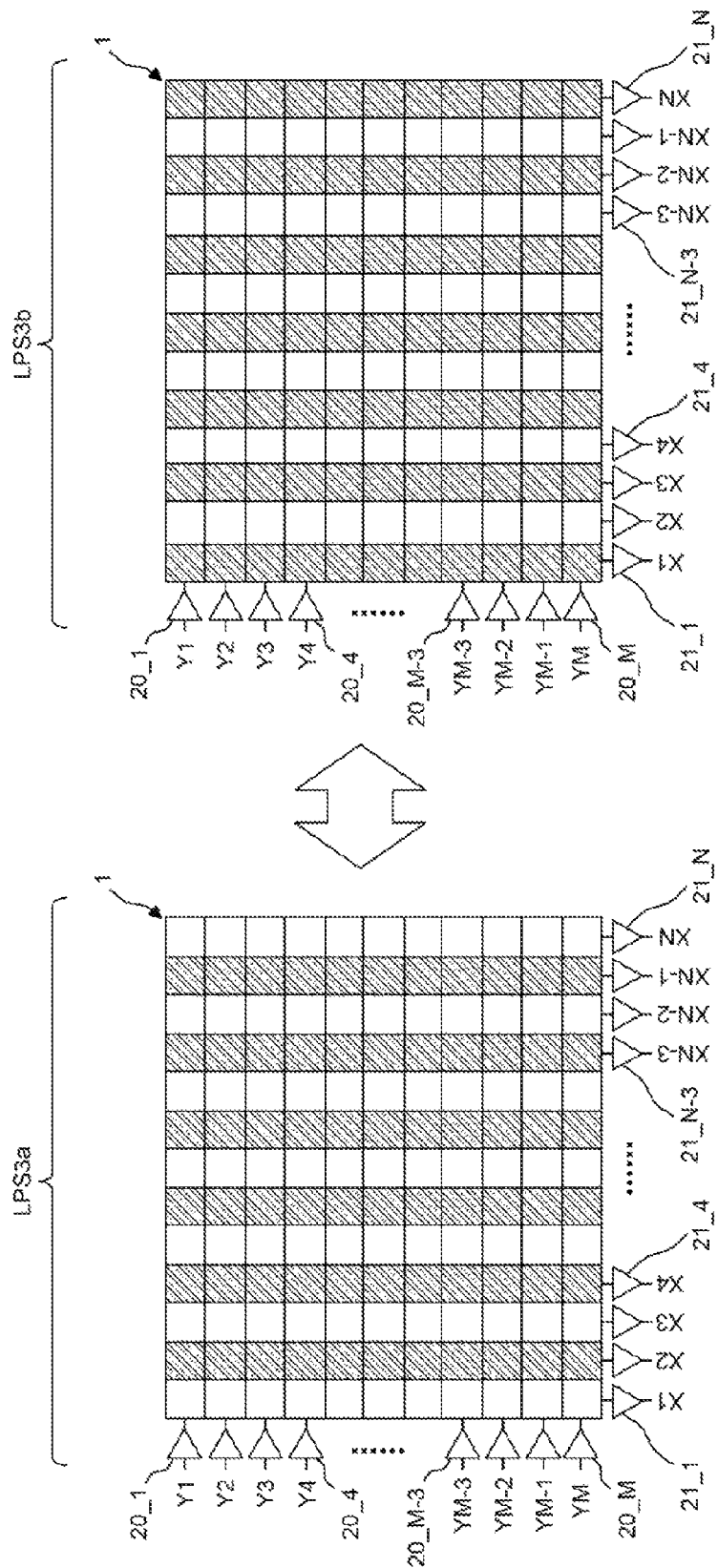
FIG. 3 is an explanatory diagram showing, by example, a low-power scan form in which the X-electrodes targeted for detection are culled at intervals of two lines, and the lines to be culled are alternately replaced with other lines.

[12] Cull the X-Electrodes Allocated to the Whole Detection Plane at Intervals of Two Lines In the semiconductor device as described in [9], the touch panel controller culls the X-electrodes targeted for detection at intervals of two lines in the low-power scan, such that the X-electrodes are allocated to the whole detection plane (see FIG. 3).

According to the arrangement like this, the X-electrodes of the detection side can be culled from the X-electrodes to be driven at intervals of two lines over the whole touch detection plane to perform the low-power scan.

[13] Cull the X-Electrodes Allocated to a Part of the Detection Plane at Intervals of Two Lines In the semiconductor device as described in [9], the touch panel controller culls the X-electrodes targeted for detection at intervals of two lines in the low-power scan exclusively for a center portion of the detection plane (FIG. 4).

According to the arrangement like this, it is made possible to contribute to the further reduction in power consumption without causing the worsening of the detection accuracy by performing the low-power scan with the X-electrodes of the detection side culled from the electrodes to be driven at intervals of two lines exclusively on a center portion of the touch detection plane. This is because the manipulation on the touch panel is performed most often on the center portion of the touch detection plane in most cases.

[14] Low-Power Scan According to an Intermittent Operation with a Downtime Arranged Therebetween In the semiconductor device as described in [9], the touch panel controller intermittently performs a low-power scan with a downtime arranged between the low-power scans in the second mode (see FIG. 9).

According to the arrangement like this, the low-power scan causes no interference even if the scan is performed at longer intervals in the case of supposing a case in which a frame is displayed with 60 Hz typically, and a touch detection is performed according to the detection scan in its spare time. This is because all that is needed is to make a determination about touch or no touch—i.e., identifying a touch coordinate is not required. The device can perform satisfactory even if the low-power scan is not continuously repeated at all times in the second mode. Therefore, it is made possible to contribute to the further reduction in power consumption by intermittently performing the low-power scan with a downtime arranged between the low-power scans in the second mode.

[15] Semiconductor Device Having a Display Driver

The semiconductor device as described in [8] further includes a display driver (4) which controls display of a liquid crystal panel disposed under the touch panel.

The arrangement like this makes easier to synchronously control the display control of the display driver and the touch control of the touch panel.

[16] First Mode (Normal Mode), Second Mode (Low-Power Mode) and Third Mode (Sleep Mode)

In the semiconductor device as described in [15], the first mode is an operation mode in which display of a display panel by the display driver is enabled. The second mode is an operation mode in which display of the display panel by the display driver is disabled. The touch panel controller has a third mode in which the touch detection on the touch panel by the touch panel controller is disabled, and the display of the display panel by the display driver is disabled.

According to the arrangement like this, it becomes possible to control the low power consumption of the semiconductor device by the first mode such as the normal mode, the second mode such as the low-power mode, and the third mode such as the sleep mode.

[17] Processor that Controls the Operation Mode

The semiconductor device as described in [16] further has a processor (5) which controls transition of the operation mode. The processor makes a determination about whether the detection plane of the touch panel is being touched or not based on detection data detected by the low-power scan in the second mode. The processor causes the operation mode to transition from the second mode to the first mode in case that it is determined as a result of the determination that the detection plane is touched. The processor makes a determination about whether the detection plane is touched or not based on detection data detected by the touch detection scan.

According to the arrangement like this, it is possible to transition from the second mode to the first mode under the control of the processor without waste.

3. Further Detailed Description of the Embodiments

The embodiments will be described further in detail.

Figure 5:
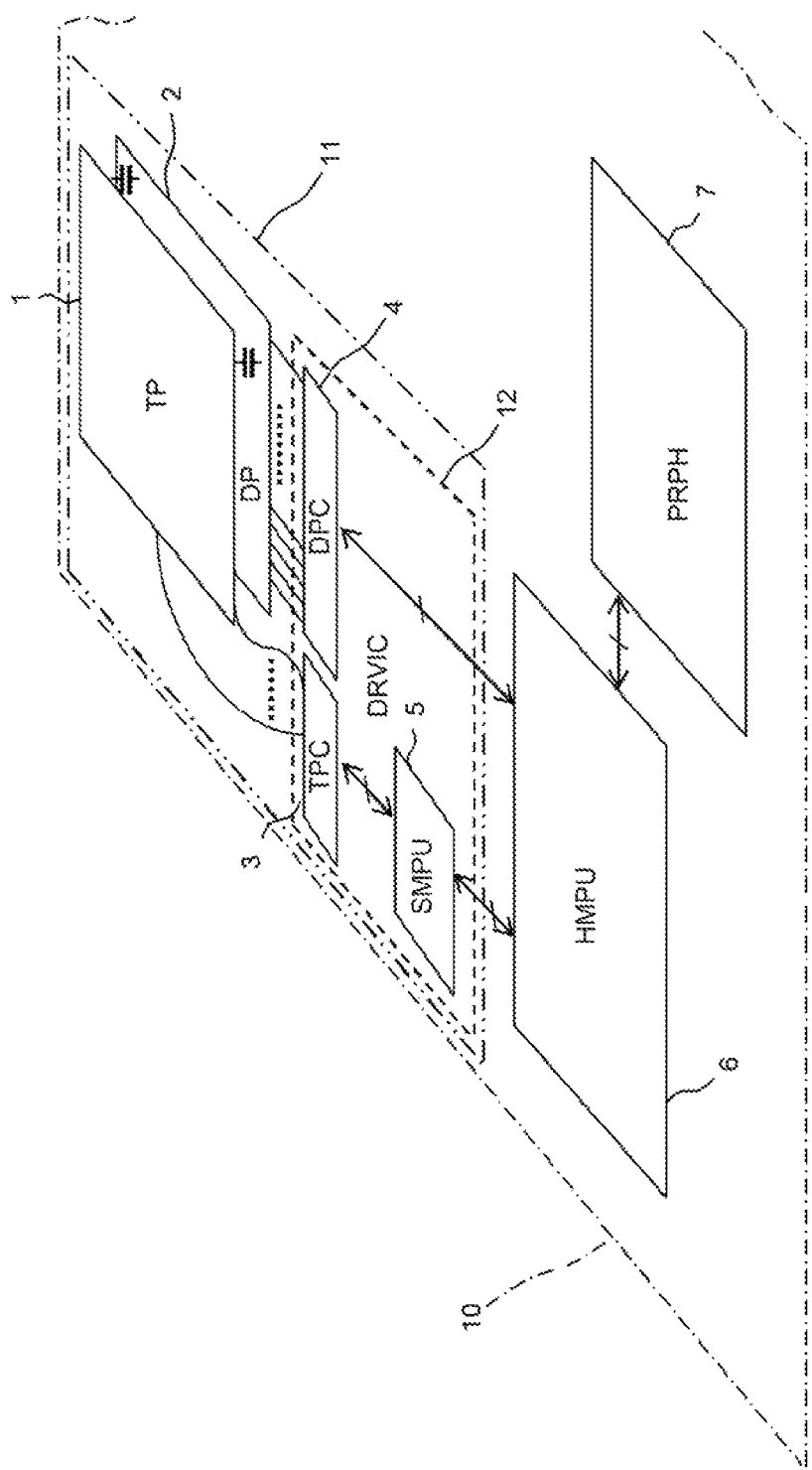
FIG. 5 is a block diagram showing, by example, the outline of PDA including a panel module for liquid crystal display and touch detection.

FIG. 5 shows, by example, the outline of a PDA (Personal Digital Assistant) 10 having a panel module for liquid crystal display and touch detection.

Although no special restriction is intended, PDA shown in the diagram has: a panel module 11; a subprocessor (SMPU) 5; a host processor (HMPU) 6; and other peripheral devices (PRPHL) 7.

The panel module 11 has: a touch panel (TP) 1; a display panel (LCD) 2; a touch panel controller (TPC) 3; and a display driver (DPC) 4. Although no special restriction is intended, a one-chip semiconductor device (DRVIC) 12 is arranged by forming the touch panel controller 3 and the display driver 4 in e.g. one semiconductor chip according to CMOS integrated circuit manufacturing technique. Although this is not particularly shown in the diagram, the semiconductor device 12 may be arranged to include the subprocessor 5, and touch panel controller 3 and the display driver 4 may be formed as separate semiconductor devices respectively.

It is not particularly shown in the diagram that the display panel 2 has e.g. a transparent electrode and pixels of liquid crystal formed on a glass substrate according to the display scale. The display panel has drive electrodes formed to connect to select terminals of the pixels in units of display lines and signal electrodes formed to connect to signal terminals of the pixels, extending in directions in which signal electrodes intersect with the drive electrodes.

The display driver 4 accepts inputs of image data from the host processor 6, and sequentially scan-drives pixels in units of display lines through scan electrodes in synchronization with a display timing; the pixels of the scan-driven display lines are supplied with gradation signals according to display data, in which the gradation signals are controlled to be provided to signal electrodes in parallel. Thus, image data of one display frame unit can be displayed on the display panel 2 in each display frame period.

Figure 6:
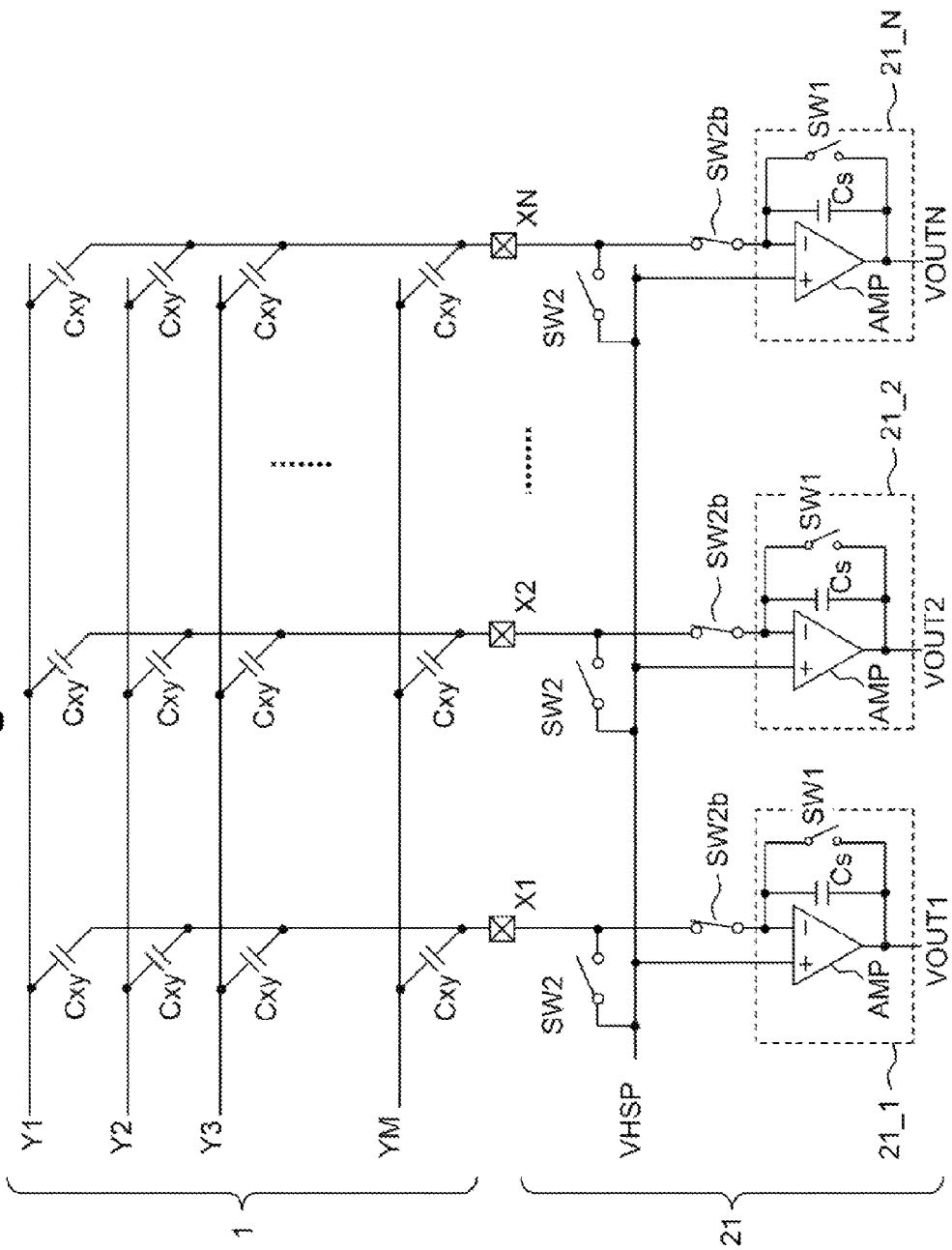
FIG. 6 is a circuit diagram showing, by example, the details of detection parts of a touch panel and a touch panel controller.

Although no special restriction is intended, the touch panel 1 has an in-cell structure in which the touch panel is formed on a surface of the display panel 2 integrally therewith, an on-cell structure in which the touch panel is disposed on the display panel 2 or the like. As shown in FIG. 6, by example, in the touch panel 1, the drive electrodes (Y-electrodes) Y1 to YM, and the detection electrodes (X-electrodes) X1 to XN are arranged to intersect with each other with a dielectric interposed therebetween; each capacitance Cxy is disposed at an intersecting position, and is connected to the corresponding X- and Y-electrodes. The Y-electrodes Y1 to YM are electrodes extending along Y direction and disposed at predetermined intervals. The X-electrodes X1 to XN are electrodes extending along X direction and disposed at predetermined intervals.

Figure 7:
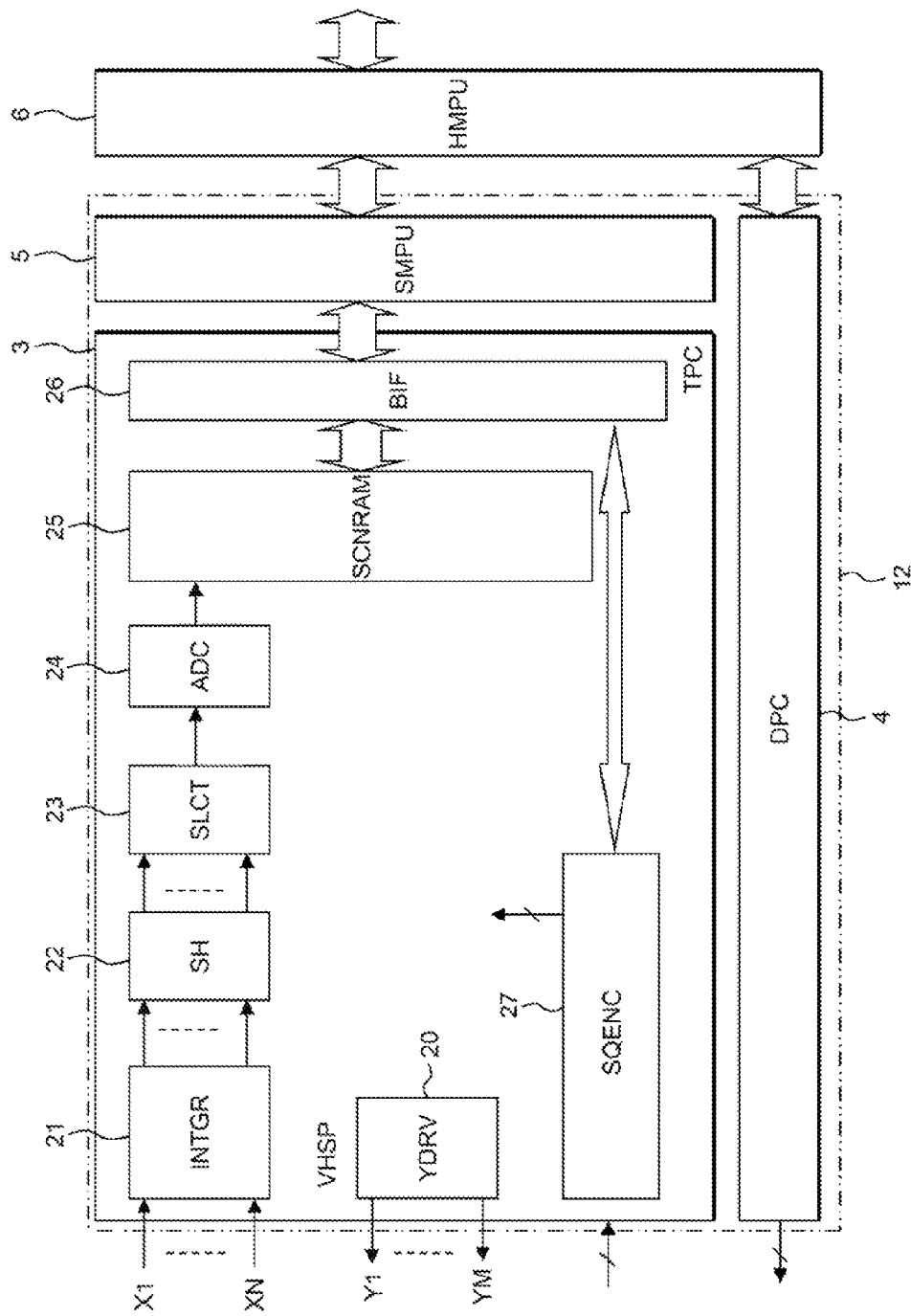
FIG. 7 is a block diagram showing a concrete example of the touch panel controller.

Referring to FIG. 7, a concrete example of the touch panel controller 3 is shown. Although no special restriction is intended, the touch panel controller 3 includes a Y-driving part (YDRV) 20 for driving the Y-electrodes Y1 to YM of the touch panel 1. In the case of the touch panel 1 which is relatively large in size as if over 10 inches, the touch panel 1 may include a Y-driving part which receives drive-control signals from the touch panel controller 3 and drives the Y-electrodes Y1 to YM.

The touch panel controller 3 is a circuit which periodically integrates signals arising on the X-electrodes X1 to XN through capacitance components such as the capacitances Cxy between the Y-electrodes Y1 to YM driven by the Y-driving part 20 and the X-electrodes X1 to XN, and creates detection data according to the capacitance components. Although no special restriction is intended, the touch panel controller 3 has: a detection part (INTGR) 21; a sample-and-hold part (SH) 22 which samples and holds detection signals of the detection part 21; a selector part (SLCT) 23 which sequentially selects and outputs signals sampled and held by the sample-and-hold part 22; an AD conversion part (ADC) 24 which converts analog signals output by the selector part 23 into digital signals; a scan buffer (SCNRAM) 25 in which digital data resulting from the conversion by the AD conversion part 24 are temporarily stored; a bus interface (BIF) 26; and a control part (SQENC) 27 which has control of the whole touch panel controller 3.

The subprocessor 5 controls the initial setting on the touch panel controller 3, and the operation thereof. That is, the subprocessor 5 writes initial set data and a command into the control part 27 through the bus interface 26. The control part decodes the written command, refers to a parameter written there, and controls the operation for touch detection. In addition, the subprocessor 5 performs a calculation of a touch position which a finger has been put close to, etc. based on detection data taken by the touch panel controller 3. Although no special restriction is intended, in on embodiment the subprocessor 5 may be omitted and its function may be performed by the host processor 6 instead.

The host processor 6 may have the whole control of PDA. For instance, if the host processor 6 creates display data, the display driver 4 receives the display data, and supplies the display panel 2 with display signals according to the display data in synchronization with the display timing. In addition, the host processor 6 receives position coordinates calculated by the subprocessor 5, analyzes an input operation on the touch panel 1 from the relations between displayed contents and the position coordinates at that time, and performs control in response to the input.

Although no special restriction is intended, PDA includes, as the peripheral circuits 7, a communication control unit, which is necessary for PDA, an image-processing unit, an audio-processing unit, and an accelerator for other data processing.

Referring to FIG. 6, the details of the detection part 21 in the touch panel controller 2 are shown, by example. The detection part 21 has e.g. integration circuit units 21_1 to 21_N as detection circuits connected to the X-electrodes X1 to XN in the one-to-one correspondence. Outputs of the integration circuit units 21_1 to 21_N are held by the sample-and-hold part 22; the signals thus held are sequentially selected by the selector 23 and supplied to the ADC 24. Signals resulting from the conversion by the ADC 24 are temporarily stored in the scan buffer 25 e.g. in units of detection frames, and then used for data processing by the subprocessor 5.

The integration circuit units 21_1 to 21_N each include e.g. a switch SW2 which receives a voltage VHSP and selectively applies the voltage VHSP to the X-electrodes X1 to XN, an operational amplifier AMP arranged so that the voltage VHSP is applied to a non-inverting input terminal (+) as a reference voltage, a switch SW2b which selectively connects the inverting input terminal (−) of the operational amplifier AMP to the corresponding X-electrodes X1 to XN, an integrating capacitor Cs disposed between the inverting input terminal (−) of the operational amplifier AMP and the output terminal, and a switch SW1 for resetting the integrating capacitor Cs. The switch SW1 serves to reset an electric charge accumulated by the capacitor Cs used for detection. Although no special restriction is intended, the switch SW2 is kept off during a pulse-drive period of the Y-electrodes Y1 to YM; the switches SW2 and SW2b are controlled in switching to be complementary to each other.

Now, an example of the integrating operation of the integration circuit units 21_1 to 21_N will be described. For instance, the Y-electrodes Y1 to YM are sequentially pulse-driven in synchronization with a period of a touch detection frame. The number of drive pulses per Y-electrode is desirably more than one. In each integrating operation, the switch SW1 is turned on first, whereby the electric charge of the capacitor Cs is reset. Then, during non-drive periods of the Y-electrodes, the X-electrodes X1 to XN are precharged by the voltage VHSP by keeping the switch SW2 on and the switch SW2b off. With the X-electrodes X1 to XN remaining precharged, the Y-electrodes Y1 to YM are sequentially pulse-driven more than once, for example. In each pulse driving, the switches SW2 are turned off, and the switches SW2b are turned on. In the switch condition like this, if the corresponding Y-electrode is pulse-driven (the pulse voltage is denoted by Vy), an electric charge (=Vy×Cxy) is caused to transfer to the precharged X-electrodes through node capacitances Cxy on the Y-electrode, and the output voltages VOUT1 to VOUTN of the operational amplifiers AMP receiving the electric charge at the respective inverting input terminals (−) are lowered by a voltage representing the electric charge thus transferred. If a finger is located near one node capacitance Cxy, a stray capacitance produced thereby decreases the capacitance value of the node capacitance Cxy.

Supposing that e.g. finger approach decreases a combined capacitance by a capacitance value Cf, an electric charge input to the operational amplifier AMP associated with the X-electrode concerned is Vy×(Cxy−Cf). Therefore, a decrease in the level of an output of the operational amplifier AMP with a touch being made is smaller than a decrease in the level of the output with no touch. A large volume of detection signals can be obtained by repeating the above operation each time the Y-electrode is pulse-driven, which is to be performed more than once successively.

Figure 8:
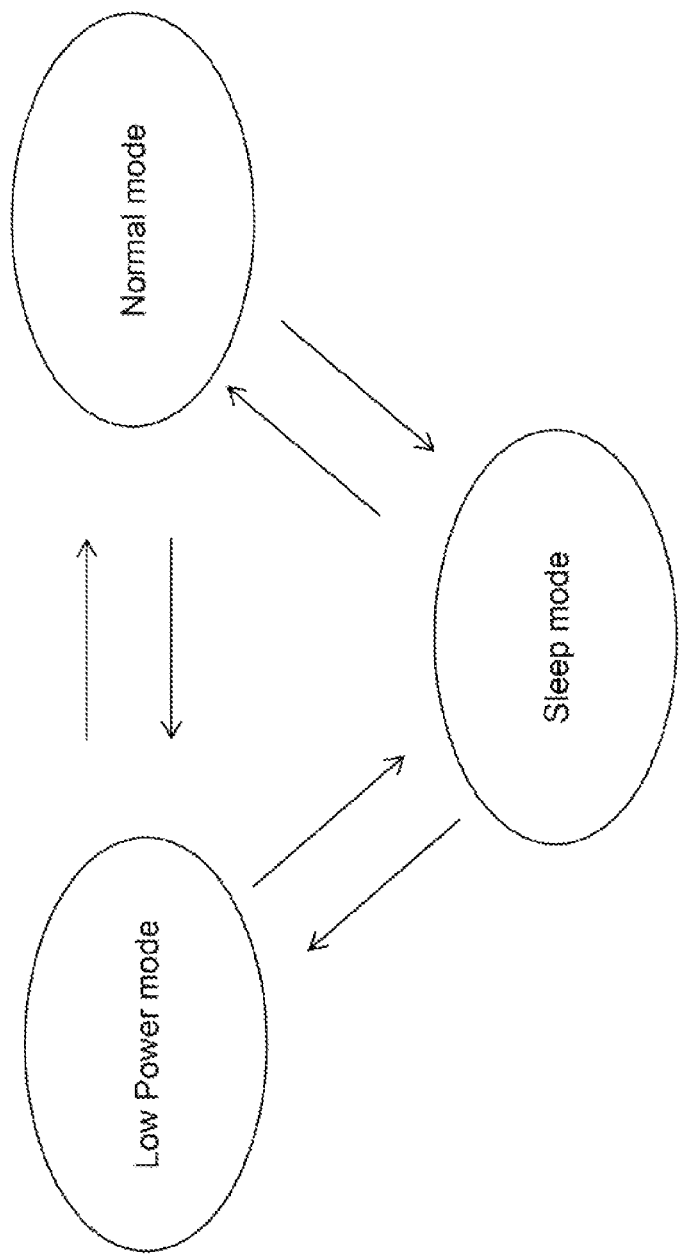
FIG. 8 is a state transition diagram schematically showing, by example, the transition of the operation mode of the semiconductor device.

The form of driving the Y-electrodes Y1 to YM, and the form of the integrating operation of integration circuit units 21_1 to 21_N through the X-electrodes X1 to XN are variably controlled by the control part 27 according to a scan mode for the touch panel. Although no special restriction is intended, the operation modes of the semiconductor device 12 are roughly classified into a normal mode as a first mode, a low-power mode as a second mode, and a sleep mode as a third mode, which are shown in FIG. 8, by example. The semiconductor device can bidirectionally transition between the normal mode and the second mode, i.e. low-power mode, between the low-power mode and the sleep mode, and between the sleep mode and the normal mode in condition according to a program executed by the subprocessor 5, the result of command execution by the control part 27, or the like. The normal mode is an operation mode in which display of the display panel 2 is performed by the display driver 4, whereas the normal scan by the touch panel controller 3 is controlled. The low-power mode is an operation mode in which the low-power scan by the touch panel controller 3 is controlled with the display driver 4 stopped from causing the display of the display panel. The sleep mode is an operation mode in which touch detection on the touch panel 1 by the touch panel controller 3 is disabled, and the display of the display panel 2 by the display driver 4 is disabled.

The transition to the sleep mode is caused e.g. by execution of a sleep command by the subprocessor 6. In case that a touch is detected, or the power source switch is turned on in the sleep state after transition to the sleep mode, the operation mode is caused to transition to the normal mode. If neither reception of a touch on the touch panel nor manipulation of the touch panel is detected for a fixed length of time in the normal mode, the operation mode is caused to transition to the low-power mode. If reception of a touch on the touch panel or manipulation of the touch panel is performed in the low-power mode, the operation mode is caused to transition to the normal mode, and if nothing is performed for a given length of time, the operation mode is caused to transition to the sleep mode again.

In the control of normal scan by the touch panel controller 3, a touch scan is arranged so that all the detection points are targeted for detection; all the Y-electrodes Y1 to YM of the touch panel 1, which uses intersection positions of the X-electrodes X1 to XN and Y-electrodes Y1 to YM as the detection points on the touch detection plane of the touch panel 1, are driven sequentially, and signals arising on the X-electrodes X1 to XN are taken at each time of driving. In other words, in one embodiment, the touch scan is a total scan on the whole touch detection plane of the touch panel 1. The total scan does not imply to perform a series of scans continuously. It may be arranged so that a scan is performed intermittently for each division region. In short, what is implied by the total scan is the operation of performing a touch detection without conducting a regular cull of lines in the X and the Y directions in a predetermined touch detection frame period. In contrast, the low-power scan is a touch scan in which the lines left after cull of lines at intervals of two lines in units of lines of the detection points on the touch detection plane of the touch panel 1 are targeted for detection.

FIG. 1 shows, by example, a low-power scan form, in which the Y-electrodes to be driven are culled at intervals of two lines, and the lines to be culled are alternately replaced with other lines. In FIGS. 1, 20_1 to 20_M represent the drive circuit units of the driving part 20 corresponding to the Y-electrodes Y1 to YM; and 21_1 to 21_N represent integration circuit units corresponding to the X-electrodes X1 to XN. In the touch panel 1, detection points in the touch detection plane are set to intersections of the Y-electrodes Y1 to YM and the X-electrodes X1 to XN. In FIG. 1, unfilled portions each represent a targeted detection point, and hatched portions each represent a detection point which is not targeted for detection. In the low-power scan form LPS1a shown in FIG. 1, of the Y-electrodes Y1 to YM, the odd-numbered Y-electrodes located at intervals of two Y-electrodes are driven sequentially, and the integration circuit units 21_1 to 21_N are activated in units of the Y-electrodes thus driven to detect signals. In the low-power scan form LPS1b, of the Y-electrodes Y1 to YM, the even-numbered Y-electrodes located at intervals of two Y-electrodes are driven sequentially, and the integration circuit units 21_1 to 21_N are activated in units of the Y-electrodes thus driven to detect signals. The low-power scan form LPS1a and the low-power scan form LPS1b alternate to each other. According to this arrangement, detection points of the lines of the Y-electrodes left after cull of lines at intervals of two lines on the touch detection plane are targeted for detection in the low-power scans LPS1a and LPS1b. The distance between the centers of the lines on the touch detection plane in one embodiment is roughly 5 mm. So, each inter-line area resulting from the line cull can be easily targeted for detection with the aid of the lines adjacent to the culled lines. Therefore, even if the lines of the Y-electrodes left after the cull of lines at intervals of two lines are targeted for detection, almost no failure to take detection signals is considered to take place. Especially, as in FIG. 1, the low-power scans LPS1a and LPS1b are executed alternately, and the lines to be culled are alternately replaced with the other lines. Therefore, the entire touch detection plane is scanned by performing each of the low-power scans LPS1a and LPS1b once. In this respect, there may be little or no risk of failing to detect a touch. In the case where detection signals are not received for an inter-line area because of the line cull, even if the distance between the centers of lines on the touch detection plane is made larger than about 5 mm, any worsening of the detection accuracy in the state of waiting for a touch input can be suppressed by alternately replacing detection lines targeted for line cull at intervals of two lines with other detection lines in units of touch detection frames of the touch detection plane.

According to the arrangement like this, it becomes possible to reduce, by half, detection lines allocated to the whole detection plane of the touch panel 1 for each low-power scan without substantially worsening the detection accuracy in regard to a mutual capacitance type touch panel 1. In other words, it is sufficient to use just a half of the integration circuit units 21_1 to 21_N for driving the Y-electrodes for each of the low-power scans LPS1a and LPS1b. Therefore, it becomes possible to make a determination about touch or no touch with a reduced power consumption without worsening the detection accuracy in the state of waiting for a touch input. In addition, it is not necessary to provide a particular additional circuit.

FIG. 2 shows, by example, a scan form by which the low-power scan is limited to a center portion of the touch detection plane, such that during the low-power scan, the Y-electrodes to be driven are culled at intervals of two lines, and the lines to be culled are alternately replaced with other lines. The scan form of FIG. 2 is different from the scan form of FIG. 1 in that the Y-electrodes Y1 to Y3 and YM−1 to YM are not driven, and detection points of lines of the Y-electrodes culled at intervals of two lines from the Y-electrodes Y4 to YM−2 of a center portion are targeted for detection. In the low-power scan form. LPS2a shown in FIG. 2, of the Y-electrodes Y5 to YM−2, the odd-numbered Y-electrodes culled at intervals of two Y-electrodes are driven sequentially, and the integration circuit units 21_1 to 21_N are activated in units of the Y-electrodes thus driven to detect signals. In the low-power scan form. LPS2b, of the Y-electrodes Y4 to YM−3, the even-numbered Y-electrodes culled at intervals of two Y-electrodes are driven sequentially, and the integration circuit units 21_1 to 21_N are activated in units of the Y-electrodes thus driven to detect signals. The low-power scan form LPS2a and the low-power scan form LPS2b alternate to each other. As to other features, the scan form of FIG. 2 is identical to the scan form of FIG. 1 and therefore, the detailed description thereof is omitted. According to the arrangement like this, it is made possible to contribute to the further reduction in power consumption without worsening the detection accuracy in the center portion by performing the low-power scan with the Y-electrodes of the drive side culled at intervals of two lines exclusively on a center portion of the touch detection plane. This is because the manipulation on the touch panel 1 is most often performed in a center portion of the touch detection plane in most cases.

FIG. 3 shows, by example, the low-power scan form in which the X-electrodes targeted for detection are culled at intervals of two lines, and the lines to be culled are alternately replaced with other lines. In the low-power scan form LPS3a shown in FIG. 3, all the Y-electrodes Y1 to YM are driven, and the odd-numbered X-electrodes culled from the X-electrodes X1 to XN at intervals of two X-electrodes are targeted for detection. In other words, of integration circuit units 21_1 to 21_N, odd-numbered integration circuit units are used for detection. In the low-power scan form LPS3b, all the Y-electrodes Y1 to YM are driven, and the even-numbered X-electrodes culled from the X-electrodes X1 to XN at intervals of two X-electrodes are targeted for detection. In other words, of the integration circuit units 21_1 to 21_N, the even-numbered integration circuit units are used for detection. The low-power scan form LPS3a and the low-power scan form LPS3b alternate to each other. According to the embodiment like this, in the low-power scans LPS3a and LPS3b, detection points of the lines of the X-electrodes left after the cull of lines at intervals of two lines on the touch detection plane are targeted for detection. As in the low-power scan form described above, the distance between the centers of the lines on the touch detection plane is roughly about 5 mm. If so, an inter-line area resulting from the line cull can be easily targeted for detection with the aid of the lines adjacent to the culled line. Therefore, there is almost no risk of failing to detect a touch when the lines of the X-electrodes left after the cull of lines at intervals of two lines are targeted for detection. Also, in the embodiment of FIG. 3, the low-power scans LPS3a and LPS3b are executed alternately to alternately replace the lines to be culled with other lines. Therefore, performing each of the low-power scans LPS3a and LPS3b once, the entire touch detection plane will be totally scanned. Also, taking this into account, there may be little or no risk of failing to detect a touch. Even when detection signals are not received for an inter-line area resulting from the line cull, if the distance between the centers of lines on the touch detection plane is made larger than about 5 mm, any worsening of the detection accuracy in the state of waiting for a touch input can be suppressed by alternately replacing detection lines targeted for line cull at intervals of two lines with other detection lines in units of touch detection frames of the touch detection plane.

According to the arrangement like this, it becomes possible to reduce, by half, detection lines allocated to the whole detection plane of the touch panel 1 for each low-power scan without substantially worsening the detection accuracy in regard to a mutual capacitance type touch panel 1. In other words, it is sufficient to use just a half of the integration circuit units 21_1 to 21_N for a detecting operation for each of the low-power scan forms LPS3a and LPS3b. Therefore, it becomes possible to make a determination about touch or no touch with a reduced power consumption without worsening the detection accuracy in the state of waiting for a touch input. In addition, it is not necessary to provide a particular additional circuit.

FIG. 4 shows, by example, a scan form by which the low-power scan is limited to a center portion of a touch detection plane, such that during the low-power scan, the X-electrodes targeted for detection are culled at intervals of two lines, and the lines to be culled are alternately replaced with other lines. The scan form of FIG. 4 is different from that of FIG. 3 in that the detecting operation is stopped as to the integration circuit units 21_1 to 21_3 for the X-electrodes X1 to X3, and the integration circuit units 21_N−2 to 21_N for the X-electrodes XN−2 to XN, and the lines culled at intervals of two lines are targeted for detection in the range of the integration circuit units 21_4 to 21_N−3 for the X-electrodes X4 to XN−3 of a center portion. In the low-power scan form LPS4a shown in FIG. 4, of the X-electrodes X5 to XN−4, the odd-numbered X-electrodes are targeted for detection at intervals of two X-electrodes in units of driving all the Y-electrodes Y1 to YM; the integration circuit units targeted for detection are activated to detect signals. In the low-power scan form LPS4b, the even-numbered X-electrodes culled from the X-electrodes X4 to XN−3 are targeted for detection at intervals of two X-electrodes in units of driving all the Y-electrodes Y1 to YM; the integration circuit units of the detection targets are activated to detect signals. The low-power scan form LPS4a and the low-power scan form LPS4b alternate to each other. As to the other features, the scan form of FIG. 4 is identical to the scan form of FIG. 3 and therefore, the detailed description thereof is omitted. According to the arrangement like this, it is made possible to contribute to the further reduction in power consumption without causing the worsening of the detection accuracy by performing the low-power scan with the X-electrodes of the detection side culled at intervals of two lines exclusively on a center portion of the touch detection plane. This is because the manipulation on the touch panel 1 is performed most often in a center portion of the touch detection plane in most cases.

FIG. 9 schematically shows, by example, the timing of an operation for touch scan in the normal mode and the low-power mode. In the diagram, ON means a state in which an operation for touch detection by the touch panel controller 3 is enabled, and OFF means a state in which the operation for touch detection is disabled. In the embodiment of FIG. 9, the normal scan is performed continuously in the normal mode. Although no special restriction is intended, the word "continuous" or "continuously" implies to perform the normal scan on an entire surface of the touch detection plane continuously in synchronization with the display frame period, e.g. in each display frame period. In contrast, in the low-power mode, the word implies to perform the low-power scan by intermittent operations with downtimes sandwiched therebetween. The cycle of the low-power scan is made e.g. several tens to several hundred milliseconds. The cycle is satisfactory as long as it offers a maximum interval which allows a touch operation to be detected in time with respect to the touch operation. Supposing a case in which a frame is displayed with 60 Hz typically, and a touch detection is performed according to the normal scan in its spare time, the low-power scan causes no interference even if the scan is performed at longer intervals. This is because it is sufficient to only make detection about touch or no touch, and it is not required to identify a touch coordinate. Therefore, it is possible to contribute to the further reduction in power consumption by intermittently performing the low-power scan with downtimes arranged between the intermittent scans in the low-power mode.

The invention is not limited to the above embodiments. It is obvious that various changes or modifications may be made without departing from the subject matter thereof.

For instance, a touch detection method to which the invention can be applied is not limited to a mutual capacitance method, and it may be a self capacitance method. The display panel is not limited to a liquid crystal display panel. It may be a plasma display panel or an electroluminescence display panel. While a case in which detection lines to be culled are alternately replaced with other ones has been described concerning the low-power scan, it is possible to select the way of not performing the replacement of the detection lines as long as the distance between adjacent detection lines is not excessively long. In addition, it is possible to arrange the low-power scan forms described in reference to FIGS. 1 to 4 so that they can be selected according to register settings. For instance, it is possible to perform control so that if there is margin in remaining battery capacity, the scan form of FIG. 1 or 3 is adopted, and if the remaining battery capacity has decreased, the scan form is switched to the form of FIG. 2 or 4.

As to the above embodiments, the case of using a double-layer touch panel in which the X-electrodes and the Y-electrodes are formed in different layers respectively has been described. The detection points are made intersection positions of the electrodes Y1 to YM and the electrodes X1 to XN. The invention is not limited to these embodiments. The invention can be also applied to a single-layer touch panel in which the X-electrodes and Y-electrodes are formed in the same layer. In such a case, the electrodes for forming detection points are not limited by the relation between X- and Y-electrodes in the case of a double-layer touch panel. For an electrode connected to each detection point, it is sufficient to appropriately adopt a wiring form or wiring structure.

What is claimed is:

1. A semiconductor device for generating detection data for touch detection with respect to a touch detection plane of a touch panel including a plurality of first electrodes extending in a first direction and a plurality of second electrodes extending in a second direction perpendicular to the first direction to intersect the first electrodes so that detection points are formed at intersections of the first and second electrodes, the touch detection plane having first edges extending in the first direction, and second edges extending in the second direction, and a center region positioned between the first edges and the second edges, the semiconductor device comprising:
   a touch panel controller comprising:
      a driving part configured to drive the first electrodes; and
      a detection part configured to receive signals from the second electrodes and generate detection data in response to the received signals,
   wherein the touch panel controller is configured to perform a normal scan on the touch detection plane of the touch panel in a first mode, wherein, during the normal scan, the driving part is configured to drive each of the first electrodes and the detection part is configured to receive signals from each of the second electrodes, and
   wherein the touch panel controller is configured to perform a first low-power scan on the touch detection plane of the touch panel in a second mode,
   wherein, during the first low-power scan, the driving part drives a first grouping of the first electrodes positioned within the center region of the touch detection plane and a second grouping of the first electrodes is undriven, the second grouping includes:
      a first subset of electrodes positioned at the first edges of the touch detection plane and a second subset of electrodes positioned within the center region of the touch detection plane, wherein the first electrodes are interleaved with the second subset of electrodes,
   wherein a first portion of the detection points positioned at intersections of the second electrodes and the first grouping of the first electrodes are used to generate the detection data during the first low-power scan, and
   wherein the touch panel controller is configured to perform a second low-power scan on the touch detection plane of the touch panel in the second mode, wherein during the second low-power scan, the driving part is configured to drive a third grouping of the first electrodes positioned within the center region of the touch detection plane and a fourth grouping of the electrodes is undriven, the fourth grouping includes:
   a third subset of electrodes positioned at the first edges of the touch detection plane and a fourth subset of electrodes positioned within the center region of the touch detection plane, wherein the electrodes of the third grouping are interleaved with electrodes of the fourth subset, and wherein the first subset and the third subset have at least two electrodes in common, the first grouping and third grouping differ by at least one electrode, the second grouping and the fourth grouping differ by at one least electrode, and the first and fourth grouping have at least one electrode in common.

2. The semiconductor device according to claim 1, wherein the touch panel controller performs the first and second low-power scans with a downtime arranged between the first and second low-power scans in the second mode.

3. The semiconductor device according to claim 1, further comprising: a display driver configured to control a display of a liquid crystal panel disposed under the touch panel.

4. The semiconductor device according to claim 3, wherein the first mode is an operation mode in which the display of a display panel by the display driver is enabled,
   wherein the second mode is an operation mode in which the display of the display panel by the display driver is disabled, and
   wherein the touch panel controller has a third mode in which the touch detection on the touch panel by the touch panel controller is disabled, and the display of the display panel by the display driver is disabled.

5. The semiconductor device according to claim 4, further comprising: a processor configured to control transition between the first, second, and third modes,
wherein the processor is configured to:
determine whether the touch detection plane of the touch panel is being touched or not based on the detection data generated during the first low-power scan in the second mode, and
upon determining that the touch detection plane is touched, transition from the second mode to the first mode.

6. A semiconductor device for touch detection with respect to a touch detection plane of a touch panel including a plurality of first electrodes extending in a first direction and a plurality of second electrodes extending in a second direction perpendicular to the first direction to intersect the first electrodes so that detection points are formed at intersections of the first and second electrodes, the touch detection plane having first edges extending in the first direction, and second edges extending in the second direction, and a center region positioned between the first edges and the second edges, the semiconductor device comprising:
a touch panel controller comprising:
a driving part configured to drive the first electrodes of the touch panel; and
a detection part configured to receive signals from second electrodes of the touch panel, and generate detection data in response to the received signals,
wherein the touch panel controller is configured to perform a normal scan on the touch detection plane of the touch panel in a first mode, wherein, during the normal scan, the driving part is configured to drive each of the first electrodes and the detection part is configured to receive signals from each of the second electrodes, and
wherein the touch panel controller is configured to perform a first low-power scan on the touch detection plane of the touch panel in a second mode,
wherein, during the first low-power scan, the detection part is configured to generate the detection data in response to signals received from a first grouping of the second electrodes, and a second grouping of the second electrodes do not receive signals, the second grouping includes:
a first subset of electrodes positioned at the first edges of the touch detection plane and a second subset of electrodes positioned within the center region of the touch detection plane, wherein the first electrodes are interleaved with the second subset of electrodes,
wherein a first portion of the detection points positioned at intersections of the first electrodes and of the second electrodes are used to generate the detection data during the first low-power scan, and wherein the touch panel controller is configured to perform a second low-power scan on the touch detection plane of the touch panel in the second mode, wherein during the second low-power scan, the detecting part is configured to generate the detection data in response to signals received from a third grouping of the first electrodes positioned within the center region of the touch detection plane and a fourth grouping of the electrodes do not receive signals, the fourth grouping includes:
a third subset of electrodes positioned at the first edges of the touch detection plane and a fourth subset of electrodes positioned within the center region of the touch detection plane, wherein the electrodes of the third grouping are interleaved with electrodes of the fourth subset, and wherein the first subset and the third subset have at least two electrodes in common, the first grouping and third grouping differ by at least one electrode, the second grouping and the fourth grouping differ by at one least electrode, and the first and fourth grouping have at least one electrode in common.

7. The semiconductor device according to claim 6, wherein the touch panel controller is configured to perform the first and second low-power scans with a downtime arranged between the first and second low-power scans in the second mode.

8. The semiconductor device according to claim 6, further comprising: a display driver which controls a display of a liquid crystal panel disposed under the touch panel.

9. The semiconductor device according to claim 8, wherein the first mode is an operation mode in which the display of a display panel by the display driver is enabled,
wherein the second mode is an operation mode in which the display of the display panel by the display driver is disabled, and
wherein the touch panel controller has a third mode in which the touch detection on the touch panel by the touch panel controller is disabled and the display of the display panel by the display driver is disabled.

10. The semiconductor device according to claim 9, further comprising: a processor configured to control transition of the between the first, second, and third modes,
wherein the processor is configured to:
determine whether the touch detection plane of the touch panel is being touched or not based on the detection data detected by the first low-power scan in the second mode,
upon determining that the touch detection plane is touched, transition from the second mode to the first mode.

* * * * *

UNITED STATES PATENT AND TRADEMARK OFFICE
CERTIFICATE OF CORRECTION

PATENT NO. : 10,001,877 B2  
APPLICATION NO. : 14/628919  
DATED : June 19, 2018  
INVENTOR(S) : Takayuki Noto Page 1 of 1

It is certified that error appears in the above-identified patent and that said Letters Patent is hereby corrected as shown below:

In the Claims

In Claim 1, on Column 15, Line 67, before "second edges" delete "and".

In Claim 1, on Column 16, Line 51, delete "one least" and insert -- least one --, therefor.

In Claim 6, on Column 17, Line 22, before "second edges" delete "and".

In Claim 6, on Column 18, Line 21, delete "one least" and insert -- least one --, therefor.

In Claim 10, on Column 18, Line 45, delete "of the between the" and insert -- between the --, therefor.

Signed and Sealed this  
Third Day of September, 2019

Andrei Iancu  
*Director of the United States Patent and Trademark Office*